F. & W. G. TYSON.
CONDENSER.
APPLICATION FILED FEB. 25, 1909.

1,071,481.

Patented Aug. 26, 1913.

4 SHEETS—SHEET 1.

Witnesses
H. L. Smith
K. D. Turner

Inventors
Frank Tyson
and
William G. Tyson
their Attorneys

F. & W. G. TYSON.
CONDENSER.
APPLICATION FILED FEB. 25, 1909.

1,071,481.

Patented Aug. 26, 1913.

4 SHEETS—SHEET 3.

Witnesses
Harry L. Smith
Hamilton T. Turner

Inventors
Frank Tyson
and
William G. Tyson
by their Attorneys
Smith & Mayer

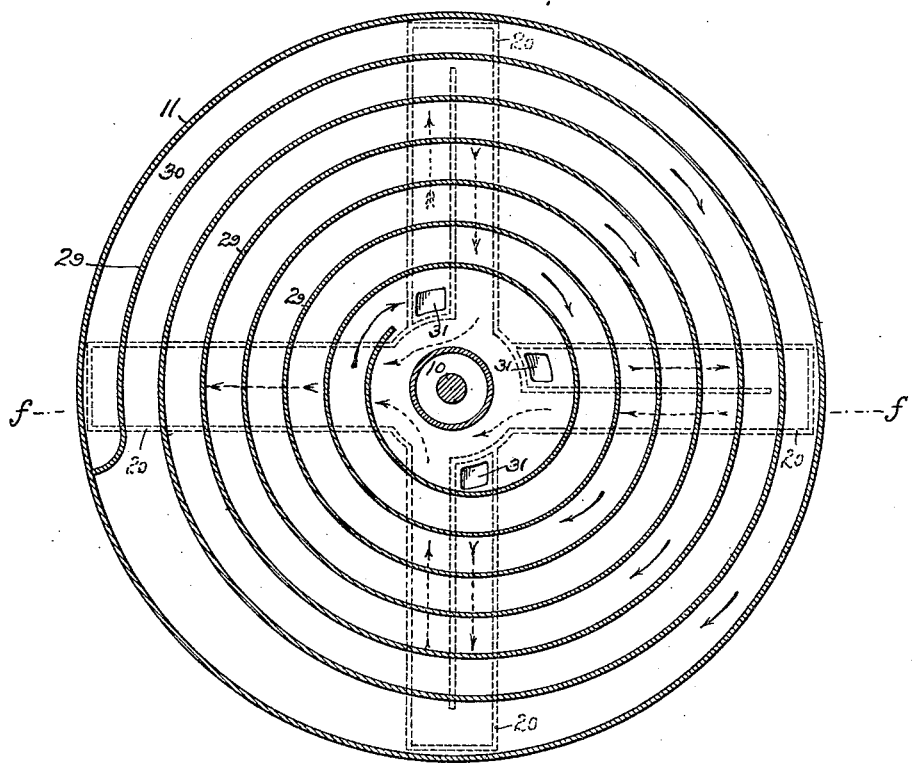
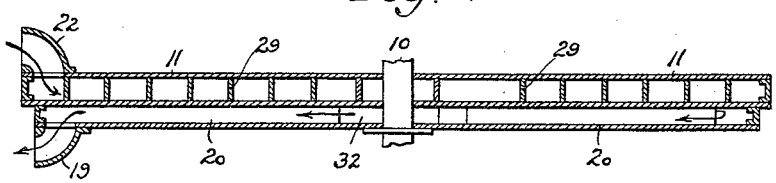

UNITED STATES PATENT OFFICE.

FRANK TYSON AND WILLIAM G. TYSON, OF CANTON, OHIO.

CONDENSER.

1,071,481. Specification of Letters Patent. Patented Aug. 26, 1913.

Application filed February 25, 1909. Serial No. 479,865.

*To all whom it may concern:*

Be it known that we, FRANK TYSON and WILLIAM G. TYSON, both citizens of the United States, residing in Canton, Ohio, have invented certain Improvements in Condensers, of which the following is a specification.

The object of our invention is to so construct a condensing apparatus for steam or other vapors, (hereinafter, for convenience, termed "steam") as to provide for the rapid condensation of large volumes of the steam with the use of a minimum quantity of the condensing agent (hereinafter referred to as "water").

Figure 1:
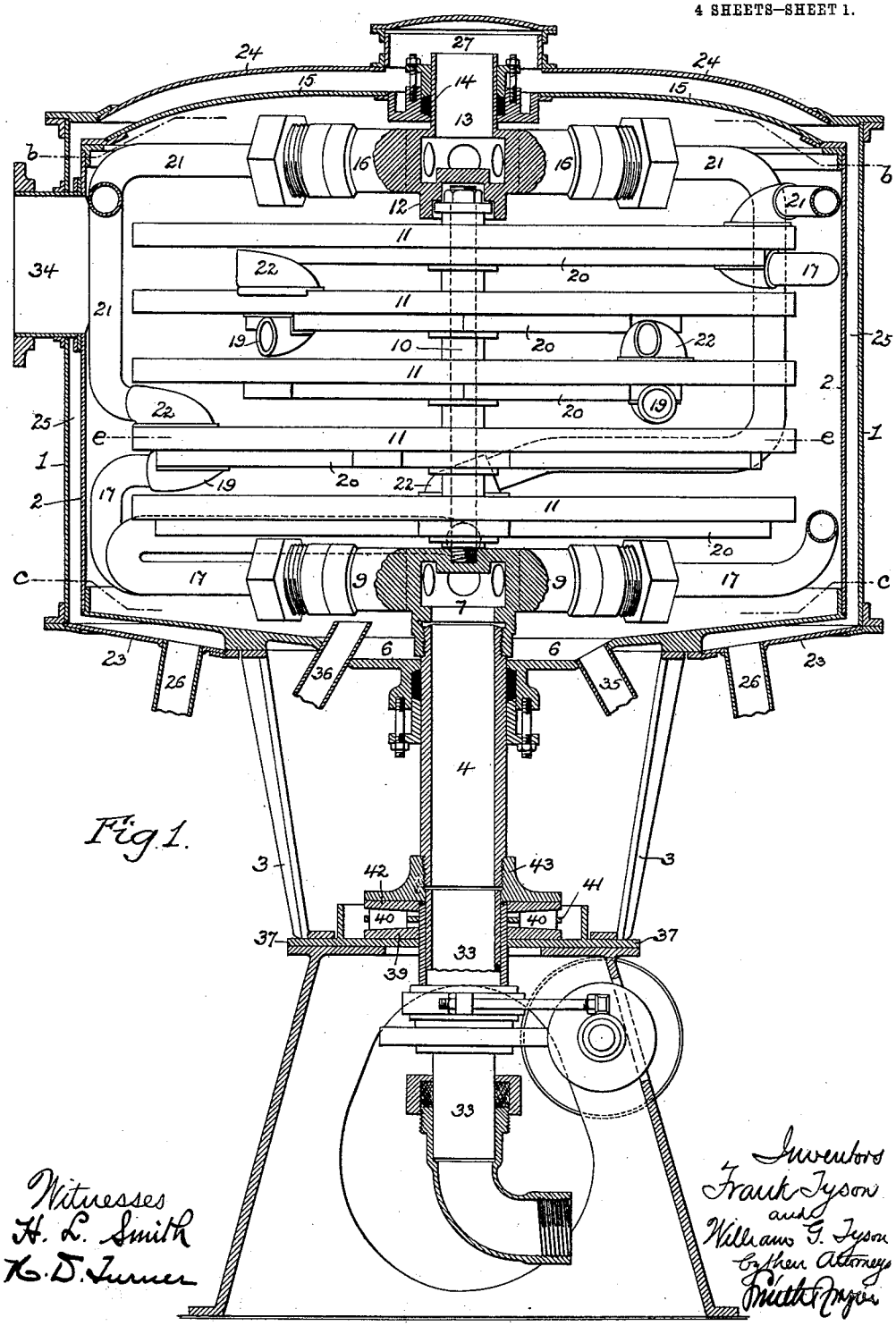
Figure 2:
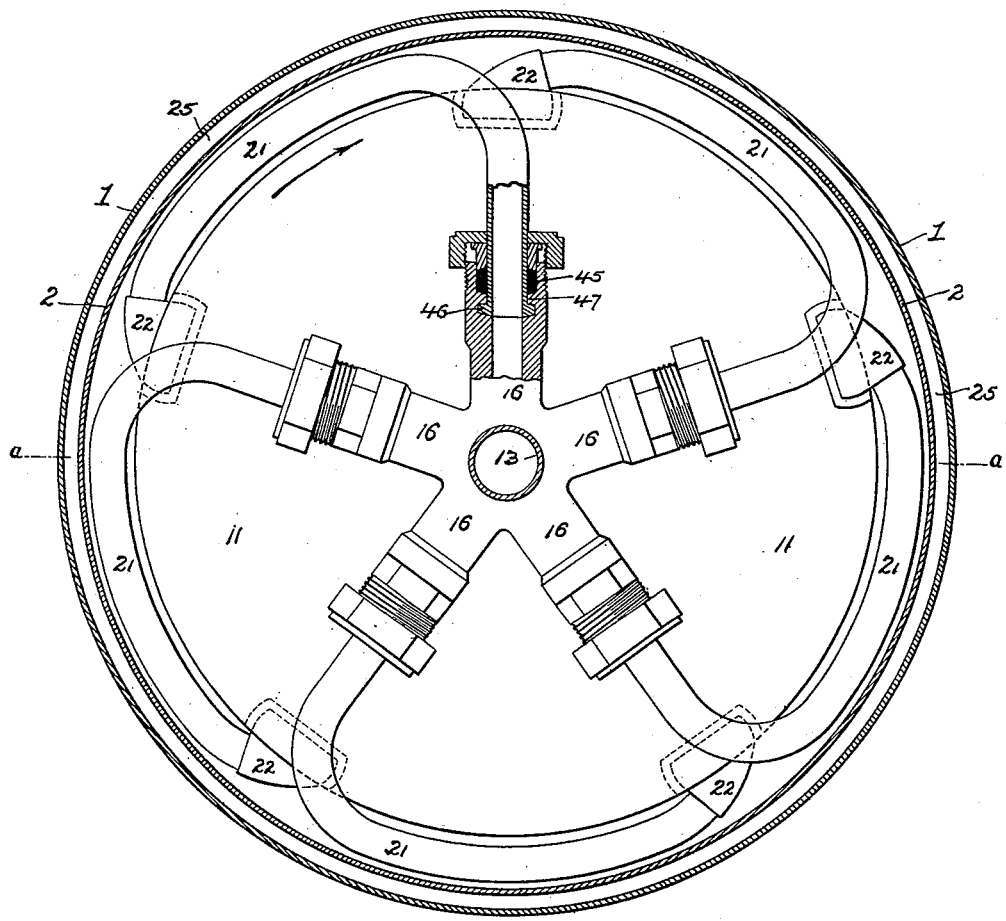
Figure 3:
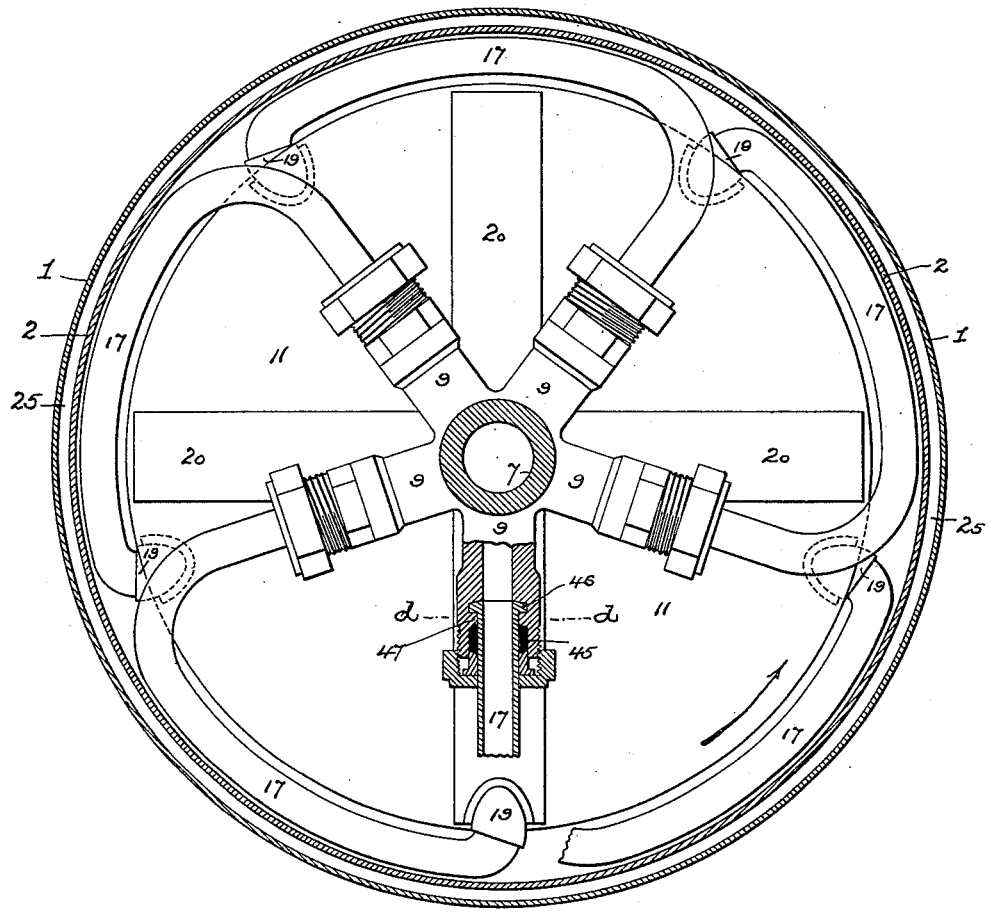
Figure 4:
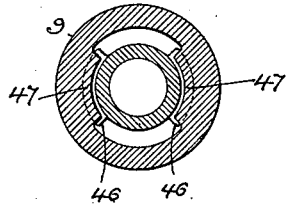

In the accompanying drawings—Figure 1 represents, in vertical transverse section on the line *a—a*, Fig. 2, condensing apparatus constructed in accordance with our invention; Fig. 2 is a horizontal section on the line *b—b*, Fig. 1, with one of the pipe connections also shown in horizontal section; Fig. 3 is an inverted horizontal section on the line *c—c*, Fig. 1, with one of the pipe connections also shown in section; Fig. 4 is a section on the line *d—d*, Fig. 3, but on a larger scale; Fig. 5 is a horizontal section on the line *e—e*, Fig. 1, of one of the hollow disks of the condenser, and Fig. 6 is a vertical section on the line *f—f*, Fig. 5.

The main casing of the condenser has an outer shell 1 and an inner shell 2, said casing being mounted upon a suitable supporting structure 3, which also carries gearing of any desired character for imparting rotative movement to a central hollow vertical shaft 4, which passes through a stuffing box on the base 6 of the inner shell 2 of the casing, and is provided, within said casing, with a hollow head 7, from which radiate a number of branches 9. Projecting upwardly from this hollow head 7 is a central vertical shaft 10, and secured to the latter in any appropriate way are a series of superposed hollow disks 11, five of these disks being shown in the present instance, although any desired number may be used, depending upon the desired capacity of the condenser.

Resting upon a flanged collar at the top of the shaft 10 and, if desired, confined thereto so as to rotate therewith, is a hollow head 12 from which projects a short vertical shaft 13 fitted to a stuffing box 14 on the top 15 of the inner shell 2 of the casing. This head 12 also has a series of radiating branches 16 communicating with the head 12 in the same manner that the branches 9 communicate with the lower head 7, and each of the branches 9 and 16 is in communication with one of the hollow disks 11, the pipe connections 17 which extend from the lower branches 9 each communicating with a hood 19 at the outer end of one of a series of hollow radiating arms 20 on the under side of one of the hollow disks 11, and each of the upper branches 16 communicating, through a pipe connection 21, with a hood 22 on the top of one of the hollow disks 11.

Between the base 6 of the inner shell of the casing and the base 23 of the outer shell, between the outer and inner shells 1 and 2, and between the top 15 of the inner shell and the top 24 of the outer shell, is a chamber 25, this chamber communicating at the bottom with pipes 26 for the inflow of the water with which the condenser is supplied, the top portion of the chamber communicating with a dome 27 centrally located on the top 24 of the outer shell of the casing and this dome communicating with the upper hollow head 12 through the short pipe section 13, and thence through the branches 16 and pipe connections 21 with each of the hollow disks 11. Each of these disks has disposed within the same a helical partition 29 so as to provide a helical passage 30, the outermost convolution of said passage being in communication with the hood 22 on the top of the disk and the innermost convolution of said passage being in communication, through openings 31 in the bottom of the disk, with all but one of the hollow arms 20 on the under side of the disk. Each of the arms 20 which communicates with the central termination of the helical passage 30 is so partitioned as to form within it an outflowing and an inflowing passage communicating with each other at the outer end of the arm, the inner end of the outflowing passage communicating with the central termination of the helical passage 30 through the opening 31, and the inner portion of the inflowing passage communicating with a chamber 32 (Fig. 6) beneath the disk, said chamber being in communication with the remaining arm 20 of the series, and the outer end of said arm being in communication with the hood 19. The water therefore enters the lower portion of the chamber 25 within the double casing of the condenser, flows through said chamber into the dome 27, thence into the upper distributing head 12 and through its branches and pipe connections into the outer convolutions of the helical passages 30 of the disks 11. After traversing said passages the water flows, as indicated by the arrows in Fig. 5, through the series of arms 20 on the undersides of the disks and finally escapes through the pipe connections 17, branches 9, lower hollow head 7, hollow shaft 4 and a pipe continuation 33 of the said shaft to any suitable point of discharge.

Steam enters the chamber within the water-jacketed casing of the condenser through an inlet pipe 34 and comes into contact with the surfaces of the rapidly rotating disks 11, their hoods 19 and 22, the pipe connections 17 and 21, and the distributing and collecting branches 16 and 9. Steam is condensed by contact with the surfaces of the hollow disks 11 and the hollow arms 20 on the underside of the same, and the water of condensation is immediately thrown off by centrifugal force into contact with the inner shell 2 of the casing and thence flows down on the inner side of said shell and along the inclined base of the same to the outlet pipe 35 by which it is conveyed to any suitable point of discharge. Steam is also condensed upon the surfaces of the hoods, pipe connections and branches, from which it is discharged by centrifugal force, and a whirling motion is imparted to the steam by reason of its contact with these rotating parts, so that the steam itself is thrown into contact with the inner shell of the double casing and is condensed thereon by reason of the chilling of said inner shell of the casing by contact with the water flowing through the chamber 25, there also being a certain amount of condensation of steam upon the top 15 and base 6 of the inner shell.

The whirling motion imparted to the steam causes it to throw against the inner shell of the casing solid or liquid particles such as globules of oil which it may contain, and these solid or liquid particles are carried down by the flow of water of condensation on the inner shell 2 and escape with said water of condensation through the pipe 35, being afterward readily separated therefrom by reason of their different specific gravity.

A partial vacuum may be maintained in the steam chamber by means of a suitable pump communicating with said chamber through a pipe 36, which extends some distance above the base 6 of the inner shell of the casing so as to preclude the possibility of any water of condensation entering the same.

The pipe connections 17 and 21 are, as shown in Figs. 2 and 3, so curved in respect to the direction of rotation of the same that the water flows backwardly in the pipes from the distributing branches 16 to the hoods 22, and from the hoods 19 to the collecting branches 9, thereby aiding in the rapid flow of the water through the pipes and their connections. The water jacket which surrounds the steam chamber of the condenser effectually prevents the inflow of air into said chamber which might otherwise occur because of the partial vacuum maintained therein.

In order to carry the weight of the rotating disks and their appurtenances the supporting plate 37 of the structure below the casing is provided with a ring 39 providing a race way for a series of truncated conical rollers 40, which are held in proper relation to one another by means of an ordinary separator plate 41, these rollers carrying a ring 42 which is secured to a flanged collar 43, the latter being secured to the lower end of the hollow shaft 4 and to the upper end of the pipe continuation 33 of said shaft, to which power is applied to operate the rotating members of the condenser.

Where each of the pipe connections 17 or 21 joins its corresponding branch 9 or 16 there is a stuffing box 45, but in order to provide a more secure connection between the pipe and branch than will be afforded by the mere frictional hold of the stuffing box packing upon the pipe, we provide the end of the latter with segmental lugs 46, as shown in Fig. 4, these lugs, when the pipe is in its proper position in respect to the branch, engaging with inwardly projecting lugs 47 in the bore of the branch, whereby the pipe is locked to the branch so far as regards any radial movement of one in respect to the other, the pipe being released from such control by a partial turn sufficient to free its lugs 46 from engagement with the lugs 47.

Although in this specification we have used the terms "steam" and "water" the term "steam" is intended to include any fluid which it is desired to condense, and the term "water" to include any available condensing agent.

We claim:—

1. The combination, in a condenser, of a casing inclosing a chamber, a rotating hollow disk structure contained in said chamber and comprising a plurality of disks, and means for supplying fluid to and discharging it from each of said disks independently of the others.

2. The combination, in a condenser, of a jacketed casing containing a chamber, a rotating hollow disk structure in said chamber comprising a plurality of disks, and means for supplying fluid to and discharging it from each of said disks independently of the others.

3. The combination, in a condenser, of a casing containing a chamber and having a jacket surrounding it, a rotating hollow disk structure in said chamber having superposed disks, means for supplying fluid to the bottom of said jacket, means for conveying fluid from the top of the jacket to the disks of the disk structure, and means for discharging said fluid from the bottom of the disk structure.

4. The combination, in a condenser, of a casing containing a steam chamber, a rotating hollow disk structure therein, and heads above and below said disk structure, one of said heads serving to distribute fluid to the disk structure and the other to receive the fluid therefrom.

5. The combination, in a condenser, of a casing inclosing a steam chamber, a rotating hollow disk structure in said chamber with upper and lower hollow shaft sections, each communicating with the disk structure and one serving to convey fluid thereto and the other to receive it therefrom.

6. The combination, in a condenser, of a rotating hollow disk structure comprising a plurality of disks, distributing and receiving heads, each having as many projecting branches as there are disks, and a pipe connection between each of said branches and its respective disk.

7. The combination, in a condenser, of a rotating hollow disk structure comprising a plurality of disks, distributing and receiving heads, each having as many projecting branches as there are disks, and a pipe connection between each of said branches and its respective disk, said pipe connections being detachable from the branches but locked thereto when in place.

8. The combination, in a condenser, of a rotating hollow disk structure comprising a plurality of disks, distributing and receiving heads, each having as many projecting branches as there are disks, and a pipe connection between each of said branches and its respective disk, said pipe connections being detachable from the branches but locked thereto when in place and having stuffing boxes beyond the locking engagements.

9. The combination, in a condenser, of a rotating hollow disk structure comprising a plurality of disks, and a fluid distributer having backwardly curved pipe connections with said disks, each of said connections being independent of the others.

10. The combination, in a condenser, of a rotating hollow disk structure comprising a plurality of disks, a fluid distributer and fluid receiver, backwardly curved pipe connections between said distributer and disks and backwardly curved pipe connections between the disks and the receiver, the connections with each disk being independent of the connections with the other disks.

11. The combination, in a condenser, of a rotating hollow disk structure comprising a plurality of disks and means whereby the fluid is both received and discharged from said disks at points adjacent to the periphery of the same.

12. The combination, in a condenser, of a rotating hollow disk structure, having a helical partition with peripheral inlet and a hollow arm communicating with the interior of the disk at the center thereof, said hollow arm having a discharge pipe connection at its outer end.

13. The combination, in a condenser, of a hollow rotatable disk structure, having thereon a plurality of external hollow arms, one of which communicates at its outer end with a discharge pipe, and means for causing flow of fluid first through the hollow disk and then through each of the hollow arms thereon.

14. The combination, in a condenser, of a rotating hollow disk structure, having a plurality of external hollow arms, one of said arms communicating with all of the others and each of the latter communicating independently with the interior of the hollow disk.

15. The combination, in a condenser, of a rotating hollow disk structure, having a plurality of external hollow arms, one of said arms communicating with all of the others and each of the latter communicating independently with the interior of the hollow disk but having a partition which causes fluid to pass first outwardly and then inwardly through the same.

16. The combination, in a condenser, of a rotating hollow disk structure, having a helical partition whereby the fluid received at the peripheral portion of the disk is caused to flow to the central portion of the same, said disk also having a plurality of external hollow arms, one of said arms communicating with all of the others and having a discharge connection at its outer end, and each of the remaining arms of the series communicating with the central portion of the chamber within the hollow disk.

In testimony whereof, we have signed our names to this specification in the presence of two subscribing witnesses.

FRANK TYSON.
WILLIAM G. TYSON.

Witnesses:
H. B. STEWART,
W. F. HAY.